United States Patent
Barbeau

(10) Patent No.: US 7,525,578 B1
(45) Date of Patent: Apr. 28, 2009

(54) DUAL-LOCATION TAGGING OF DIGITAL IMAGE FILES

(75) Inventor: Pierre Barbeau, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 680 days.

(21) Appl. No.: 10/945,132

(22) Filed: Sep. 20, 2004

Related U.S. Application Data

(60) Provisional application No. 60/604,777, filed on Aug. 26, 2004.

(51) Int. Cl.
*H04N 5/76* (2006.01)
*H04N 5/232* (2006.01)

(52) U.S. Cl. .................... 348/231.3; 348/211.2

(58) Field of Classification Search .......... 348/207.1, 348/211.2, 211.3, 231.3, 231.5, 231.6
See application file for complete search history.

(56) References Cited

U.S. PATENT DOCUMENTS

| | | | |
|---|---|---|---|
| 5,327,144 A | 7/1994 | Stilp et al. | 342/387 |
| 5,386,117 A | 1/1995 | Piety et al. | 250/330 |
| 5,402,171 A | 3/1995 | Tagami et al. | 348/219.1 |
| 5,748,484 A | 5/1998 | Cannon et al. | 364/479.03 |
| 5,806,005 A | 9/1998 | Hull et al. | 455/566 |
| 5,943,603 A | 8/1999 | Parulski et al. | 725/133 |
| 6,282,362 B1 | 8/2001 | Murphy et al. | 386/46 |
| 6,344,853 B1 | 2/2002 | Knight | 345/629 |
| 6,359,837 B1 | 3/2002 | Tsukamoto | 368/10 |
| 6,396,537 B1 | 5/2002 | Squilla et al. | 348/239 |
| 6,449,485 B1 | 9/2002 | Anzil | 455/456.1 |
| 6,507,362 B1 | 1/2003 | Akerib | 725/109 |
| 6,573,927 B2 | 6/2003 | Parulski et al. | 348/32 |
| 6,636,259 B1 | 10/2003 | Anderson et al. | 348/211.3 |
| 6,657,661 B1 | 12/2003 | Cazier | 348/231.2 |
| 6,741,864 B2 | 5/2004 | Wilcock et al. | 455/456.1 |
| 6,833,861 B2 | 12/2004 | Matsumoto et al. | 348/207.2 |
| 6,853,461 B1 | 2/2005 | Shiimori | 358/1.15 |
| 6,862,045 B2 | 3/2005 | Morimoto et al. | 348/515 |
| 6,911,992 B2 | 6/2005 | Bronstein et al. | 345/629 |
| 6,912,398 B1 | 6/2005 | Domnitz | 455/461 |
| 6,914,626 B2 | 7/2005 | Squibbs | 348/231.3 |

(Continued)

FOREIGN PATENT DOCUMENTS

DE 19913019 A1 2/2001

(Continued)

OTHER PUBLICATIONS

Audio Device, Covert Tracking System, http://www.spyshopusa.com/Tracking_S.htm, printed from the World Wide Web on Apr. 1, 2002.

(Continued)

*Primary Examiner*—Lin Ye
*Assistant Examiner*—Jason Whipkey

(57) ABSTRACT

A method and system for creating digital image files provides for writing capture location metadata and transmit location metadata into a digital image file. A digital camera captures an image, stores digital image data in a digital image file and then adds capture location metadata into the digital image file. The digital camera then receives a user request to transmit the digital image file to a network server, and in response to the user request the digital camera writes transmit location metadata into the digital image file. The digital camera then sends the digital image file to the network server.

15 Claims, 4 Drawing Sheets

U.S. PATENT DOCUMENTS

| | | | |
|---|---|---|---|
| 6,941,276 | B2 | 9/2005 | Haeberli .................. 705/26 |
| 6,980,829 | B2* | 12/2005 | Yamazaki et al. ........ 348/211.2 |
| 7,145,898 | B1 | 12/2006 | Elliott |
| 2001/0040627 | A1* | 11/2001 | Obradovich ............... 348/222 |
| 2002/0054224 | A1 | 5/2002 | Wasula et al. .............. 348/232 |
| 2002/0137528 | A1 | 9/2002 | Fraccaroli .................. 455/457 |
| 2002/0143521 | A1* | 10/2002 | Call ............................. 704/1 |
| 2002/0154221 | A1* | 10/2002 | Ishimaru .................. 348/207.1 |
| 2003/0061369 | A1* | 3/2003 | Aksu et al. ................. 709/231 |
| 2003/0112354 | A1* | 6/2003 | Ortiz et al. ............ 348/333.01 |
| 2003/0137422 | A1 | 7/2003 | Nishibori ................. 340/573.1 |
| 2003/0193603 | A1* | 10/2003 | Parulski et al. ......... 348/333.12 |
| 2003/0202101 | A1 | 10/2003 | Monroe et al. ............. 348/156 |
| 2003/0202104 | A1* | 10/2003 | Werner .................. 348/207.99 |
| 2003/0206316 | A1 | 11/2003 | Anderson et al. .......... 358/1.18 |
| 2004/0001148 | A1* | 1/2004 | Takemoto ................ 348/211.2 |
| 2004/0004663 | A1* | 1/2004 | Kahn et al. .............. 348/207.1 |
| 2004/0015191 | A1 | 1/2004 | Otman et al. ................. 607/5 |
| 2004/0061782 | A1* | 4/2004 | Kinjo ....................... 348/207.1 |
| 2004/0175046 | A1* | 9/2004 | Gormish ..................... 382/232 |
| 2004/0189813 | A1* | 9/2004 | Tanaka .................. 348/207.99 |
| 2005/0073594 | A1* | 4/2005 | Tagawa ................... 348/231.3 |
| 2005/0193421 | A1* | 9/2005 | Cragun .................. 348/211.11 |
| 2005/0213551 | A1* | 9/2005 | Suzuki et al. ............... 370/338 |

FOREIGN PATENT DOCUMENTS

| WO | WO0075859 A1 | 12/2000 |
|---|---|---|
| WO | WO0186511 A2 | 11/2001 |

OTHER PUBLICATIONS

Technical Metadata for Digital Still Images—National Information Standards Organization (NISO), http://www.niso.org/committees/committee_au.html, printed from the World Wide Web on Apr. 25, 2002.

Portelligent, Epson Location Organizer with Camera & GPS Performance and Design Analysis, Report #140-991020-1b, 2000.

Harvard University Library: Digital Repository Service (DRS), "DRS Documentation—Administrative Metadata for Digital Still Images," v.1.2, Feb. 20, 2002.

Cat-Photo Standard 2.0 Tags, Cat-Photo Information, http://www.cat-photo.sourceforge.net/standard/tags.html, printed from the World Wide Web on Apr. 23, 2002.

Trimble Navigation Ltd.—GPS Software—ODELCO, Media Mapper, http://www.odelco.com/TRIMBLE/mmapper.htm, printed from the World Wide Web on Apr. 1, 2002.

"Datum Unveils Breakthrough Timing Technology for Telecommunications, Enterprise and OEM Applications," Press Release dated Feb. 8, 1999.

EOM Archives, http://www.eomonline.com/Common/Archives/November%2098/g2.htm, printed from the World Wide Web on Apr. 2, 2002.

EndRun Technologies, CDMA Timing Technology: No Antenna Hassle, http://www.endruntechnologies.com/cdma.htm, printed from the World Wide Web on Feb. 19, 2002, reprinted in full on Mar. 6, 2003.

EndRun Technologies, "Praecis Ce—OEM Time & Frequency Engine," printed on Apr. 4, 2002.

"It's a camera, a PDA, a phone! It's Origami!," http://www.nwfusion.com/columnists/2001/1126cooltools.html, printed from the World Wide Web on Apr. 1, 2002.

IBM, "IBM 340 MB Microdrive—Transforming Storage Technology," 1998.

Digital Imaging Group, Inc., "DIG35 Specification—Metadata for Digital Images," Version 1, Aug. 30, 2000.

Digital Imaging Group, Inc. "DIG35 Specification—Metadata for Digital Images," Version 1.1 Working Draft, Apr. 16, 2001.

I3A-DIG35, "Metadata Standards a Smarter Way to Look at Digital Images," http://www.i3a.org/l_dig35.html, printed from the World Wide Web on Apr. 29, 2002.

Overview, GPS Photo Link, http://www.geospatialexperts.com/gpl/help/overview.html, printed from the World Wide Web on Apr. 29, 2002.

Image Archive, http://ocean.ucc.ie/00/hanrahag/minipro/html, printed from the World Wide Web on Apr. 29, 2002.

Microsoft Windows Platform Development, "MetaData in Image Files and GDI+," http://www.microsoft.com/hwdev/tech/display/GDIplus_Metadata.asp, printed from the World Wide Web on Apr. 29, 2002.

NISO Draft Standard, "Data Dictionary—Technical Metadata for Digital Still Images," Working draft, 1.0, Jul. 5, 2000.

Praecis Ce, OEM Time & Frequency Engine, EndRun Technologies, Nov. 14, 2000, pp. 1-2.

Symmetricom—Symmetricom's breakthrough clock technology uses CDMA signals for timing the network edge, http://www.symmetricom.com/news/020899.html, printed from the World Wide Web on Aug. 8, 2002.

JC Labs, Inc.—HSC-500 ×2 Camera, http://www.jclabs.com/hsc-500.html, printed from the World Wide Web on Feb. 25, 2002.

Meteor-II/MC, http:www.fabrimex.ch/meteor-il.htm, printed from the World Wide Web on Feb. 25, 2002.

EndRun Technologies—Products—CDMA Technology, http:www.endruntechnologies.com/cdma.htm, printed from the World Wide Web on Aug. 8, 2002.

EndRun Technologies; Benefits of GPS vs. CDMA, http://www.endruntechnologies.com/gps-cdma.htm, printed from the World Wide Web on Jan. 18, 2002.

Point Grey Research, Dragonfly, IEEE-1394 Digital Camera, printed from the World Wide Web on Sep. 5, 2002.

Xeni Jardin, "Phonecam Nation." (Document recites it was posted on Jun. 10, 2003. Document was printed from the World Wide Web.)

TheKansasCityChannel.com, "Teen Uses Camera Phone to Thwart Apparent Abduction." (Document recites it was posted on Aug. 1, 2003. Document was printed from the World Wide Web.)

"Camera Phone Hang-up." (Document was posted on the World Wide Web at least as early as Dec. 23, 2003. Document was printed from the World Wide Web.)

"What to do when you're in an Accident." (Document was posted on the World Wide Web at least as early as Feb. 18, 2004. Document was printed from the World Wide Web.)

* cited by examiner

DUAL-LOCATION TAGGING OF DIGITAL IMAGE FILES

REFERENCE TO RELATED APPLICATIONS

This application is a continuation-in-part of co-pending U.S. application Ser. No. 10/151,499 filed on May 20, 2002, and co-pending U.S. application Ser. No. 10/751,628 filed on Jan. 5, 2004. The entirety of both applications is incorporated herein by reference.

BACKGROUND OF THE INVENTION

1. Field of the Invention

The present invention relates to digital photography and, more particularly, to creating digital image files.

2. Description of Related Art

The popularity of digital photography has grown significantly over recent years. As a general matter, digital photography is very similar to conventional film-based photography, except that photographs taken with a digital camera are stored as digital files rather than being recorded on film. Digital photography thereby provides users with immediate access to photographs without the need for film developing.

Typically, a digital camera will receive and resolve light into an array of pixels that cooperatively represent an image, and the camera will produce digital representations of each pixel, reflecting image characteristics such as color and intensity. The camera will then store the digital pixel representation (or other digital representation of the image) in a digital image file, usually on a removable storage medium such as a Flash memory card, for instance. Additionally, a camera may insert into the digital image file a date and time stamp of when the image was created.

Most digital cameras further include an LCD display screen that a user can employ as a viewfinder and to selectively view stored images. Further, a user can typically transfer images from a digital camera onto a personal computer, for viewing, emailing, storing, editing, and printing, through a cable connection between the camera and computer, or by removing a memory card from the camera and coupling the card to the computer.

Recently, digital camera technology has been integrated into wireless communication devices such as cellular telephones. A combined digital camera and a cellular telephone, known as a "camera phone," allows for both capturing images and convenient wireless transmission of the images over a data network to a remote server.

Provided with the ability to capture and instantly view and manipulate digital images, users of digital cameras build large collections of digital image files. Often, a user will store those files on a computer hard drive or other personal storage device. Alternatively, a user may upload the files to a network server (e.g., a web server) for centralized storage and convenient access.

Additionally, users may want to print some or all of their digital images, in order to share hard copies of the images (photographs) with family and friends, or to store the photographs in photo albums. Several mechanisms exist for printing hard copies of digital images.

As an example, a user could transfer image files from a digital camera to a personal computer and then print the images on a personal photo printer connected to the computer. As another example, a user could bring the image files on a digital storage medium (e.g., a Flash memory card) to a brick-and-mortar photo processing lab and order prints in a manner similar to how a user would normally order photographs to be printed from film.

As still another example, a user could upload the image files to an online photo processing lab. With the widespread popularity of the Internet and data communications, many such services have recently become available. In practice, a user would establish an account with an online photo processing service provider, and the user would then upload digital image files to the service provider and instruct the service provider to print the images. The service provider would then print the images and ship them to the user.

SUMMARY

The present invention provides a method and apparatus for creating improved digital image files. Such improved digital image files will contain metadata indicating the location where the image was captured and the location from which the image is transmitted to a network. A digital camera will thus be able to write both capture location and transmit location metadata into the digital image files it creates.

Writing both capture location metadata and transmit location metadata into a digital image file will provide users with a better way to manage their digital image files. The capture location metadata can be used to help with the organization, storage, and retrieval of images. Specifically, a digital image file containing a particular capture location could be automatically saved in a folder that is designated to hold images containing that particular capture location.

The transmit location metadata can be used to facilitate selection of a photo processing lab that is nearest to the transmit location. That is, when a user transmits a digital image file to a network server, the server may use the transmit location metadata to determine which photo processing labs are nearest to the transmit location and present the user with a list of the nearest labs. The user could then select one of the labs and the network server will send the digital image file to the selected lab for printing or other processing. Alternatively, the server may send the digital image file to the nearest photo processing lab automatically, without the user's participation.

As an example, a digital image that is taken in Chicago and transmitted to a network server from New York could contain "Chicago" capture location metadata and "New York" transmit location metadata. The Chicago capture location metadata in the digital image file could allow the file to be automatically stored in folder designated to hold images taken in Chicago. On the other hand, the New York transmit location could provide the network server with information that will allow the server to determine which photo processing labs are closest to the New York transmit location. The network server could then present those labs to the user for the user to, in turn, select the photo processing lab of his choice. And, after receiving a selection from the user, the network server could send the digital image file to the selected lab. Or, as was mentioned above, the network server may automatically send the file to the photo processing lab closest to the New York transmit location.

Additionally, when a network server receives a digital image file that contains both capture and transmit location metadata, the server may read the capture location and then use the capture location as a basis to determine which folder the file should be saved in, and then store the file locally. Alternatively, the network server could forward the digital image file to be stored at another entity, such as a third party photo server specified by the user. That is, if the user has a photo-management account established with another entity, the user could have his photos stored there instead of at the network server. Similarly, the network server could itself determine which photo processing labs are closest to the transmit location, or the server could simply forward the image to another entity that will make that determination.

Generally, the capture and transmit locations may be in the form of a city name, latitude and longitude coordinates, in the form of a postal address with a city, state, and zip code, or in some other form. The metadata representing the capture and transmit locations could be structured as markup language (e.g., XML), and a binary representation of the markup language can be stored as header information (or otherwise) in the digital image file.

Thus, in one respect, an exemplary embodiment of the invention may take the form of a method comprising the steps of (i) capturing a photographic image into a digital camera, and storing the photographic image in a digital image file on the camera, (ii) recording as first metadata in the digital image file a capture location of the photographic image, and (iii) recording as second metadata in the digital image file a transmit location of the photographic image, and transmitting the digital image file from the digital camera to a network server, whereby the digital image file transmitted to the network server includes both the capture location and the transmit location.

In another respect, an exemplary embodiment may take the form of a device that comprises (i) a processor, (ii) data storage for storing a photographic image in a digital image file, (iii) program instructions executable by the processor to write to the digital image file a capture location and a transmit location, and (iv) program instructions executable by the processor to transmit the digital image file including the capture location and the transmit location from the device to a network server.

In yet another respect, an exemplary embodiment may take the form of a photo management system that comprises (i) data storage, (ii) a first routine stored in data storage and executable to receive a photographic image file defining (1) a photographic image, (2) capture location, and (3) transmit location, (iii) a second routine stored in data storage and executable to read the photographic image file and identify the capture location and transmit location, (iv) a third routine stored in data storage and executable to select, based on capture location, a storage location for the photographic image; (v) a fourth routine stored in data storage and executable to store the photographic image at the storage location, (vi) a fifth routine stored in data storage and executable to select, based on transmit location, a processing lab at which to print the photographic image, and (vii) a sixth routine stored in data storage and executable to send the photographic image to the selected processing lab for printing.

Further, in another respect, an exemplary embodiment may take the form of a machine-readable apparatus encoded with a digital image file, wherein the digital image file contains (i) pixel data representative of a photographic image, (ii) first metadata indicating a capture location of the photographic image, and (iii) second metadata indicating a transmit location of the photographic image.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Process Overview

Figure 1:
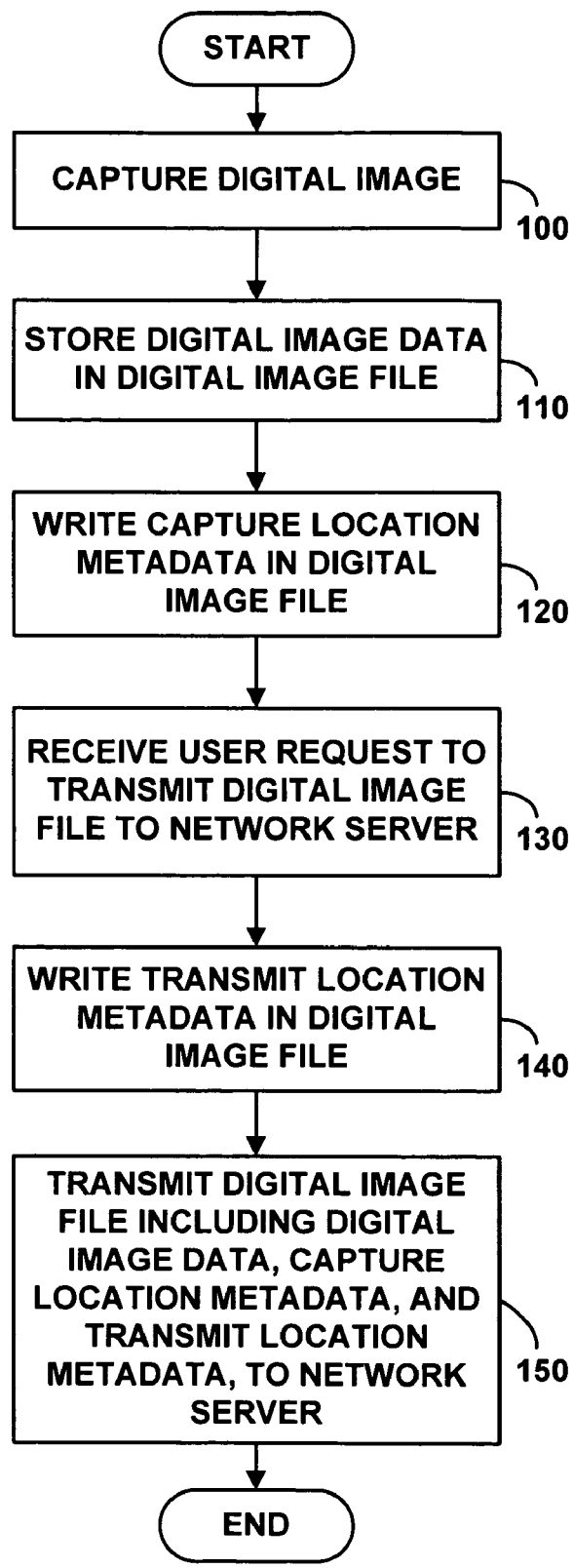
FIG. 1 is a flow chart illustrating functions carried out in accordance with the exemplary embodiment.

In one respect, an exemplary embodiment of the present invention may take the form of a method for establishing digital image files that include capture location and transmit location metadata. FIG. 1 is a flow chart illustrating an exemplary embodiment of this method. As shown in FIG. 1, at block 100 a digital camera may capture a digital image. At block 110 the digital camera may store digital image data in a digital image file. At block 120, the digital camera may write capture location metadata into the digital image file. At block 130, the digital camera may receive a user request to transmit the digital image file to a network server and in response to the user request, at block 140, the digital camera could write the transmit location metadata into the digital image file. At block 150 the digital camera may transmit the digital image file including digital image data, capture location metadata, and transmit location metadata to the network server. (Note that the order of elements can vary from that shown and described.)

Thus, in accordance with the exemplary embodiment described above, a user will be able to create digital image files marked with both capture and transmit location metadata. The capture and transmit location metadata may be in the form of latitude and longitude coordinates, city name, postal address with city, state, and zip code, or even the name of an establishment where the digital camera is located. The capture location metadata may then be used to determine where the digital image file should be stored. The transmit location metadata may, in turn, be used to determine which photo processing lab is closest to the transmit location.

While, in the exemplary embodiment, a digital camera captures the digital image, stores digital image data in a digital image file and writes capture and transmit location metadata into the digital image file, any entity could perform some or all of these functions. For instance, it is possible that the digital camera will capture the digital image and write capture location metadata into the digital image file, but then the network server will write the transmit location metadata into the digital image file. It is also possible that a user will manually enter capture and/or transmit location metadata into the digital image file.

2. Exemplary Architecture a. Exemplary Wireless Network

Figure 2:
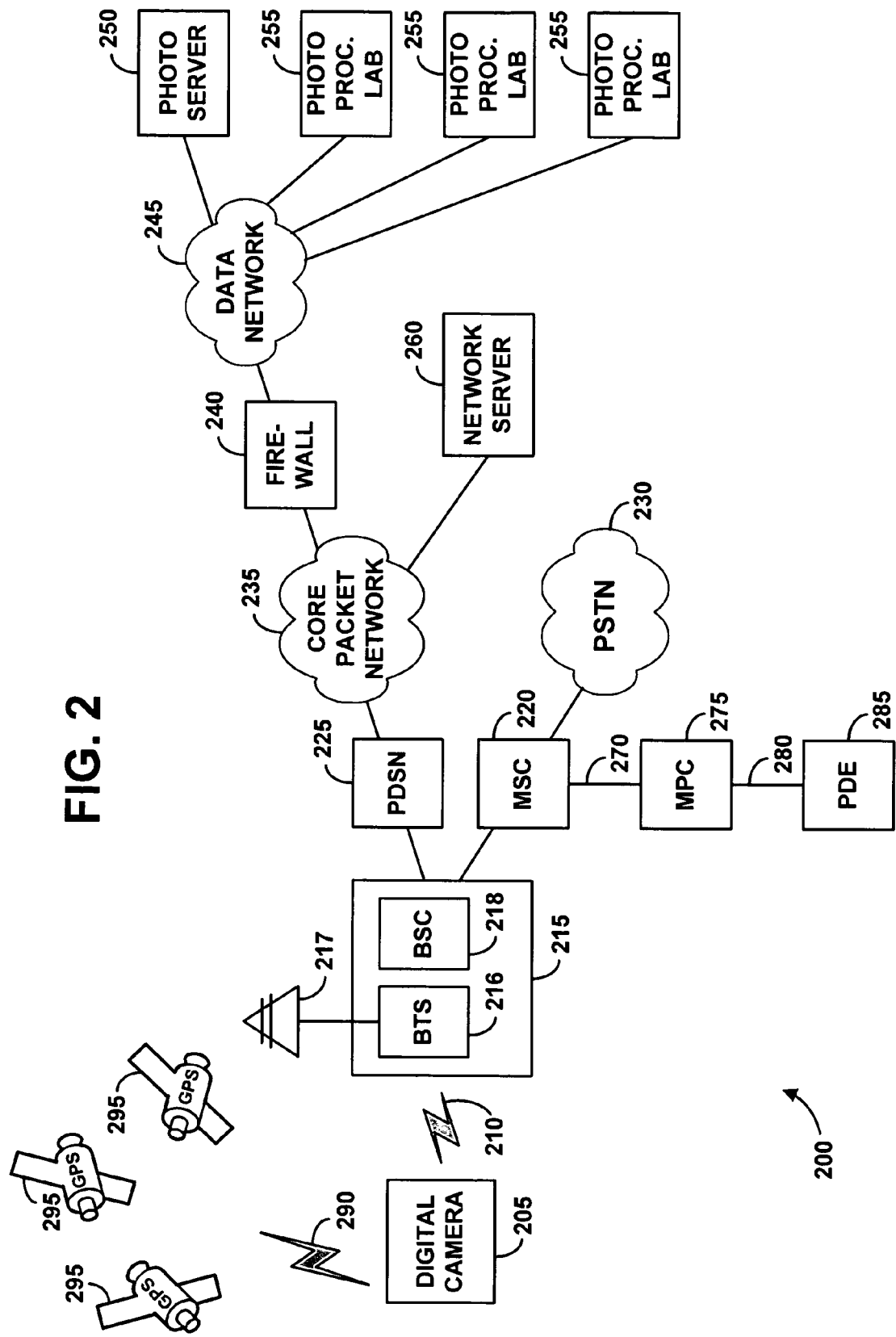
FIG. 2 is a block diagram of a wireless communications network arranged to employ the exemplary embodiment.

The invention can be carried out in a wireless network, an example of which is illustrated in FIG. 2. Wireless network 200 includes a digital camera 205 arranged to communicate over a radio frequency (RF) air interface 210 with a base station 215. Base station 215, in turn, includes a base transceiver station (BTS) 216, which provides an antenna 217 for communicating with the digital camera 205, and a base station controller (BSC) 218, which controls communications with the BTS 216. The base station 215 is then coupled to a switch or gateway, such as a mobile switching center (MSC) 220 or a packet data serving node (PDSN) 225. The MSC 220 is a switch that provides connectivity with a public switched telephone network (PSTN) 230, while the PDSN 225 is a gateway to a wireless carrier's core packet network 235. The core packet network 235 may be an IP network. The core packet network 235 is then coupled via a firewall 240 to a data network 245. The data network 245 may be, for instance, the Internet.

MSC 220 is also shown coupled via a signaling link 270 to a mobile positioning center (MPC) 275, which is arranged to determine and report a device's location to a requesting entity. MPC 275 in turn includes or is coupled via a signaling link 280 with position determining equipment (PDE) 285, which operates to determine the location of a given device based on (i) the centroid of the cell/sector in which the device is currently operating and (ii) satellite-based positioning information provided by the device itself. MPC 275 and PDE 285 are functionally defined by industry standard 3GPP2 X.P0002/TIA PN-4747 (IS-881), which is hereby incorporated by reference. Generally speaking, the MPC functions to retrieve, forward, and store position data, and the PDE functions to determine precise position or geographic location of a mobile station.

MPC 275 can be implemented as one or more computer applications and database functions programmed on an SCP such as the Integrated Service Control Point ("ISCP") made by Telcordia Technologies, Inc. Further, another SCP may be positioned along signaling link 270, so that MSC 220 may communicate with the other SCP, and the other SCP in turn may communicate with the MPC 220.

The exemplary arrangement also includes Global Positioning System (GPS) satellites 295 which may communicate directly with the digital camera 205 via a wireless link 290. The GPS satellites 295 may provide digital camera 205 with its location at the time when digital camera 205 captures a digital image or at the time when digital camera 205 receives a user request to transmit a digital image file to a network server.

As further shown in FIG. 2, the exemplary arrangement includes a network server 260 disposed on the core packet network 235. With this arrangement, the digital camera 205 could capture a digital image and transmit the image in a digital image file to network server 260 via a communication path comprising air interface 210, base station 215, PDSN 225, and core packet network 235.

Preferably, the digital image file will contain capture and transmit location metadata as well as digital image data. Once the network server 260 receives the digital image file, the network server 260 could read the capture location metadata and use it as a basis to determine where the digital image file should be stored, (with or without user involvement). The network server 260 may then store the digital image file in a folder designated to hold images with a capture location matching the capture location in the digital image file.

Alternatively, network server 260 may forward the digital image file to a photo server 250, which could also use the capture location as a basis to determine where to store the digital image file, and then store it. The photo server 250 may reside on or be accessible through the data network 245. Also, the photo server 250 may be associated with a website where users can view and otherwise manage their digital image files. If the network server 260 or the photo server 250 does not already have a folder designated to hold files with a particular capture location, the network server 260 and photo server 250 could create a new folder for such files.

Similarly, network server 260 could read the transmit location metadata and use it as a basis to determine which of the photo processing labs 255 accessible through the data network 245 is closest to the transmit location. After the network server 260 makes that determination, it may automatically send the digital image file to the closest photo processing lab 255. Or, as was previously discussed, before automatically sending the file to the closest photo processing lab 255, network server 260 could first communicate the determination back to the user via the core packet network 235, PDSN 225, and base station 215. The user could then approve the determination or select another photo processing lab 255, and direct network server 260 to send the digital image file there.

The photo processing labs 255 can be brick-and-mortar processing labs of the type that a person could visit, such as a corner drugstore for instance. Photo processing (printing) equipment at such a brick-and-mortar processing lab could be connected to the data network 245 through a conventional high speed network connection. The photo processing labs 255 can also be strictly on-line only entities where a user may have an account. Digital image files sent there may be printed and mailed to the user.

b. Exemplary Digital Camera

Digital camera 205 could be arranged to capture the digital images itself, in which case the digital camera could take the form of either a plain digital camera, a camera phone, a personal digital assistant (PDA), or another similar device. Alternatively, the digital camera could acquire the images in some other way, such as through transfer from another device.

Figure 3:
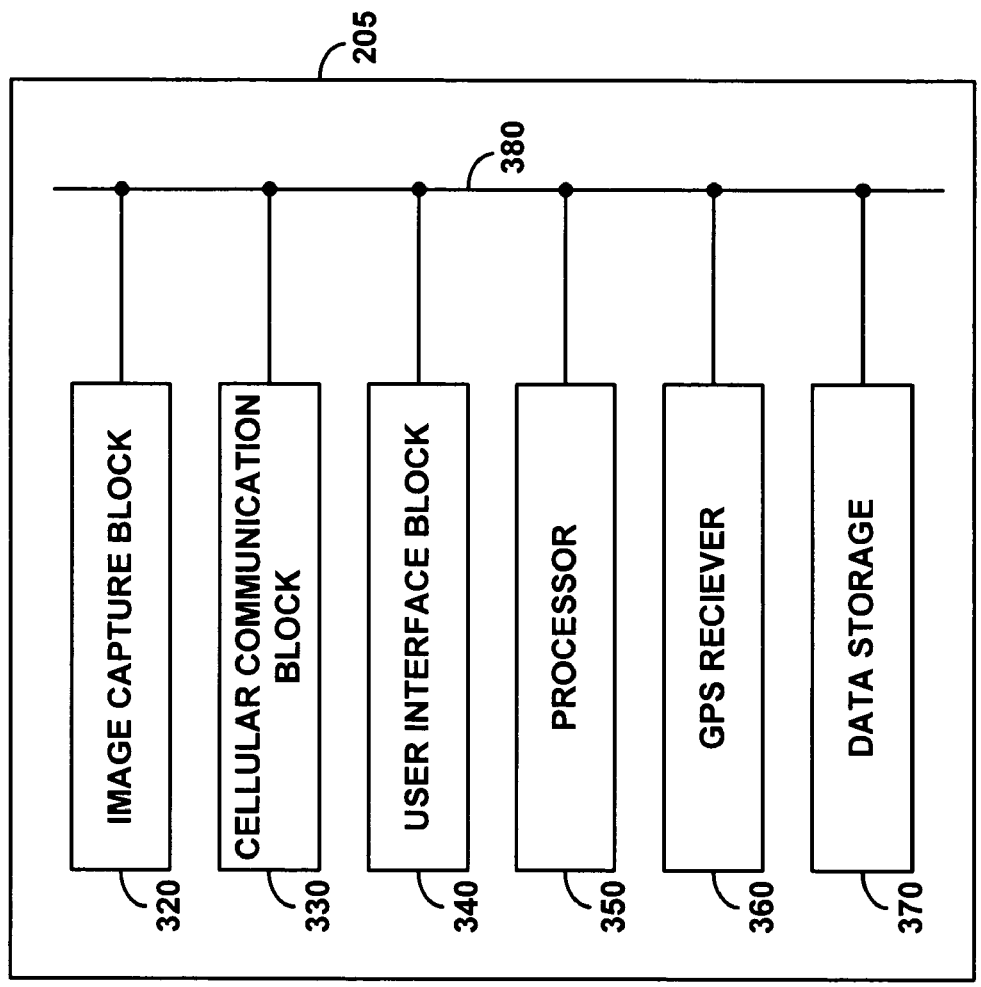
FIG. 3 is a block diagram of a digital camera operative within the network of FIG. 2.

FIG. 3 is a block diagram that illustrates some of the functional components of an exemplary digital camera 205. As shown in FIG. 3, the exemplary digital camera 205 includes an image-capture block 320, a cellular-communication block 330, a user interface block 340, a processor 350, a global positioning system (GPS) receiver 360, and data storage 370, all of which may be communicatively linked together by a system bus or other mechanism 380. The digital camera 205, however, may include other elements instead of, or in addition, to those described herein. Further, the digital camera 205 could me made up of multiple devices connected together (such as a camera and a computer, for instance).

Image-capture block 320 functions to capture an image. As such, the image-capture block 320 may include components conventionally found in a digital camera, such as a lens for receiving light that defines the image, a flash for illuminating the scene being photographed, and a mechanism to establish a digital representation of the image. The mechanism may include a CCD or CMOS image sensor array, for instance, which resolves the light into pixels, and a digitizer that establishes digital representations of the pixels. The image-capture block 320 may then work cooperatively with the processor 350, passing an array of the digital pixel representations to the processor 350 for storage in the data storage 370.

Cellular-communication block 330 functions to establish and engage in communications over the air interface 210 with the base station 215. In this regard, the digital camera 205 and the base station 215 may communicate over the air interface 210 according to any agreed air interface protocol, such as CDMA, TDMA, GPRS/GSM or 802.11. By way of example, the air interface protocol may be CDMA, which is defined by industry standards IS-95A/95B and, more recently, IS-2000 (cdma2000) published by the Telecommunications Industry Association. The details of CDMA, and IS-95/IS-2000 in particular, are well-known to those of ordinary skill in the art.

To facilitate communication over the air interface 210 and with the base station 215, the cellular-communication block 330 may include a CDMA chipset and an antenna, for instance. Exemplary CDMA chipsets and antennas are those found conventionally in CDMA-capable mobile stations or wireless communication devices, such as mobile stations made to operate within the Sprint PCS® wireless network for instance. An example CDMA chipset is the MSM7xxx chipset manufactured by Qualcomm Incorporated of San Diego, Calif.

Preferably, the cellular-communication block 330 will allow for packet-data communication via PDSN 225. For instance, after securing a radio link over air interface 210, the cellular-communication block 330 may negotiate with the PDSN 225 to secure a data link (typically a point-to-point protocol (PPP) link), and may obtain an IP address (typically a mobile-IP address). The digital camera 205 can then communicate packet data with entities on the core packet network 235 or entities on the data network 245, for instance.

User interface block 340, in turn, may include a display (e.g., LCD) for presenting images captured by the image-capture block 320, and for presenting text-based and/or graphics-based menus or prompts to users. Additionally, user interface block 340 may include one or more input mechanisms, such as buttons or a touch-sensitive display so that the user can instruct the digital camera 205 to capture an image and/or to send the image to the network server 260, the photo server 250, or a photo processing lab 255.

Data storage 370 serves to store data, such as images captured or otherwise acquired by digital camera 205. The data storage 370 may take various forms, in one or more parts. For example, data storage 370 may comprise random access memory (RAM) or read only memory (ROM) resident in the digital camera 205, which holds program instructions and data defining logic executable by the processor 350. In addition, data storage 370 may comprise a removable storage medium, such as a Flash memory card for instance. Data storage 370 could be integrated in whole or in part with processor 350.

In addition to holding digital image data, data storage 370 also preferably holds logic executable by processor 350 to carry out various functions described herein. For instance, the logic could cause processor 350 to determine a location of the digital camera in response to the digital camera capturing a digital image or in response to initiating transmission of a digital image file to network server 260. The logic could cause the processor to determine the location in various ways, many of which are well known in the telecommunications field, and to then store the determined location in data storage 370 for later reference.

As an example, the logic could cause processor 350 to determine the location of the digital camera by interacting with a GPS receiver 360. In this regard, GPS receiver 360 may be a GPS 1 receiver manufactured by Qualcomm Incorporated of San Diego, Calif. or could be any other satellite positioning receiver. In response to a query by processor 350, the GPS receiver 360 could measure the arrival times of signals transmitted from a group of GPS satellites 295 and could use the arrival times to determine the location of the digital camera 205. The GPS receiver 360 could then report the determined location to the processor, as latitude/longitude coordinates for instance.

As another example, the logic could cause processor 350 to determine the location of the digital camera 250 through user-camera interaction. Once the digital camera 205 captures an image or receives a user request to transmit a digital image file to the network server 260, the logic could cause the user interface block 340 to present the user with a menu (or allow user to access a menu). From the menu, the user could select an option allowing the user to manually enter the location information. The user may enter the location information in the form of a city, street address, zip code, neighborhood, establishment, or any other location identifier or combination of location identifiers. The processor 350 would then store the location information as metadata in the digital image file.

As yet another example, the logic could cause the processor to determine the location of the digital camera 205 through messaging over air interface 210. In this regard, those skilled in the art are well aware of mechanisms through which a cellular wireless communication device can engage messaging with a radio access network, to learn the current location of the device. The location determined by these mechanisms could be as granular as latitude/longitude coordinates at or near the device or as general as the position of the base station 215 that is serving the device. Thus, as a particular example, the digital camera 205 could receive an indication of its location by engaging in position determination messaging over the air interface 210 according to the well known IS-801 protocol published by the Telecommunications Industry Association.

The logic could also cause the processor to write to a digital image file an indication of the digital camera's location when the digital camera captures an image (capture location), or when the camera initiates transmission of a digital image file to network server 260 (transmit location). The logic could cause the processor to store capture and transmit location information as metadata in a header of the digital image file, or in some other form.

3. Exemplary Operation a. Capture of Digital Image

Digital camera 205 will function to capture a digital image in any manner now known or later developed. Generally speaking, for example, a user of the digital camera will focus the lens on a given object or scene and will press a shutter release button. Responsively, the image-capture block of the digital camera, in cooperation with the processor, will establish and store a digital representation of the image, through any image-capturing processes now known or later developed. In the exemplary embodiment depicted in FIG. 3, the processor 350 will store the digital representation of the image as binary data in a digital image file within data storage 370.

b. Receipt and Content of Location Information

In accordance with the exemplary embodiment illustrated in FIGS. 1, 2 and 3, when digital camera 205 captures a digital image or when the digital camera receives a user request to transmit a digital image file to network server 260, the digital camera 205 will receive location information from a GPS receiver 360, a user, base station 215, or another entity able to indicate a location of the digital camera 205. Digital camera 205 will then use that information as a basis to establish metadata image characterization in the digital image file. The location information that digital camera 205 receives may take various forms, the particulars of which are not necessarily important as long as the location information is of a type that can be used to characterize the digital image in terms of location.

What matters in the exemplary embodiment is that the digital camera establishes metadata image characterization when it captures an image and, again, when it transmits the digital image file to network server 260. The location information itself can range from extremely granular, such as a precise indication of the geographic coordinates where the digital camera is positioned, to less granular, such as a general indication of an area in which the digital camera is positioned.

c. Derivation of Metadata Image Characterization

In accordance with the exemplary embodiment, the digital camera 205 may derive the metadata image characterization from the location information provided to it by the user, the GPS receiver 360, cellular base station 215, or another entity. The digital camera 205 may do so in any of a variety of ways. One way to do so is to establish a set of XML markup language that characterizes the location. Further, the digital camera may convert the XML markup language into a binary representation, for storage in the digital image file.

For example, if the location information that the digital camera 205 extracted from GPS receiver 360 is in the form of latitude and longitude coordinates "39.043, −94.533," then the digital camera might formulate the metadata image characterization to include markup language such as: <LOCATION LAT="39.043" LON="−94.533"></LOCATION>. Other examples are possible as well.

d. Storage of Metadata Image Characterization in Digital Image File

According to the exemplary embodiment, the digital camera will store the capture location metadata and transmit location metadata within the digital image file, together with the digital image data. Preferably, the digital camera will do so in a standardized way, so that any suitably-programmed processor can later access the metadata as well as the digital image data.

By way of example, the digital camera may structure the digital image file to include a metadata portion and an image data portion. The metadata and image data portions of the file could be discrete sections, or they could be interleaved or otherwise combined.

Figure 4:
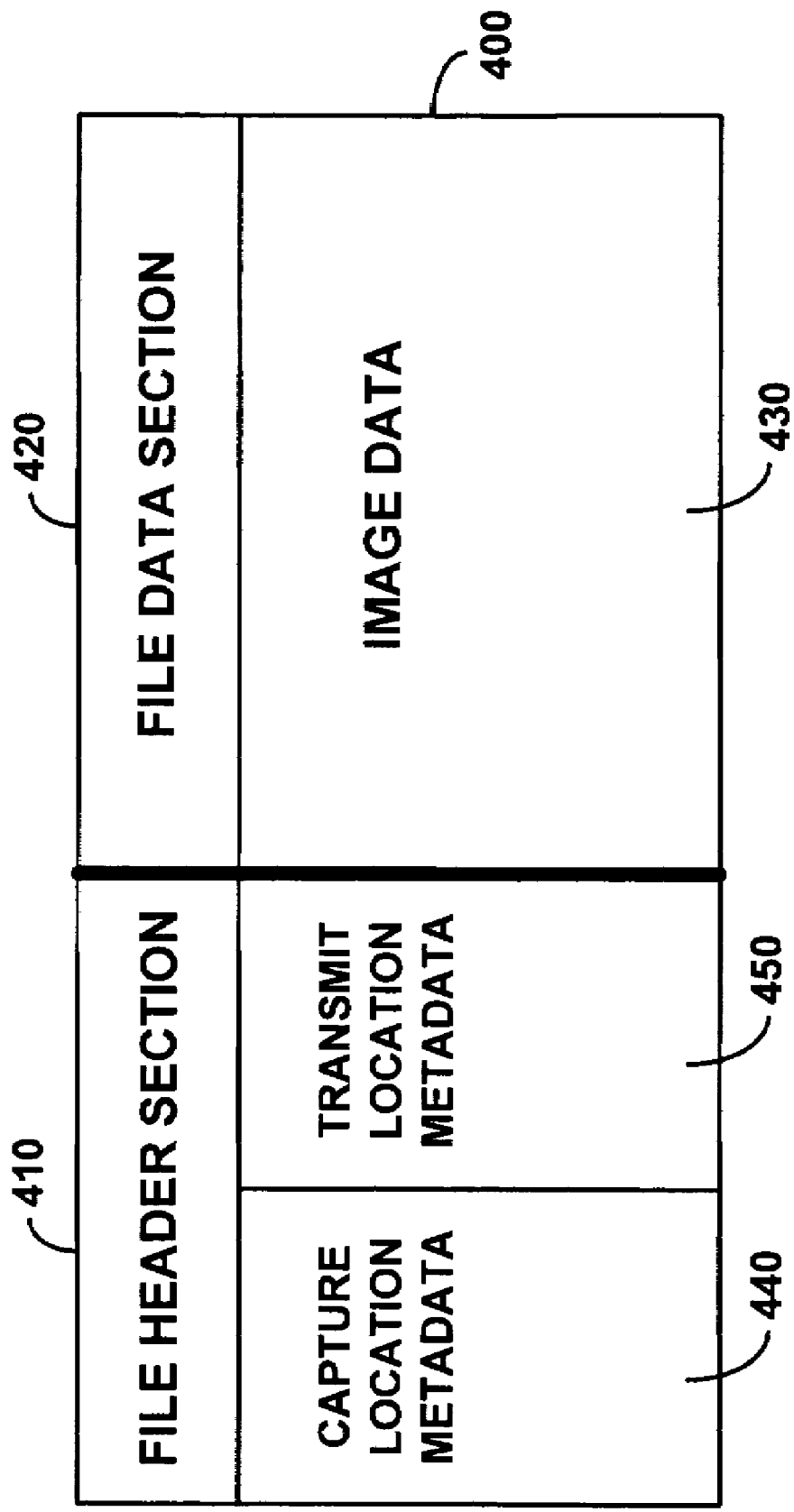
FIG. 4 is a block diagram of an exemplary digital image file including capture location and transmits location metadata.

FIG. 4 depicts an exemplary digital image file 400 established by digital camera 205 in data storage 370. As shown in FIG. 4, the digital image file 400 includes a file header section 410 and a file data section 420. According to an exemplary embodiment, the digital image file 400 has two sets of metadata image characterizations stored within the file header section 410, capture location metadata 440 and transmit location metadata 450. The digital camera also has image data 430 stored within the file data section 420. Thus, a processor can readily read capture location metadata 440 and transmit location metadata 450 from digital image file 400 by referring to the file header section 410. A processor can also readily read image data 430 from the digital image file 400 by referring to the file data section 420.

Therefore, in accordance with an exemplary embodiment, when a digital image file is transmitted to network server 260 for storage, network server 260 could read the capture location metadata to determine where to store the digital image file. And, similarly, when a digital image file is transmitted to network server 260 for the purpose of printing a hard copy of the image, network server 260 could read the transmit location metadata to determine which photo processing lab is nearest to the transmit location.

Further, digital camera 205 may store capture location metadata 440, transmit location metadata 450, and image data 430 within a digital image file 400 in any order. For example, the camera may first store image data 430 and then add capture location metadata 440 or it may first store capture location metadata 440 and then add image data 430. Or, the camera may store capture location metadata 440 or transmit location metadata 450, and image data 430 in the digital image file 400 at once.

4. Conclusion

An exemplary embodiment of the present invention has been described above. Those skilled in the art will understand, however, that changes and modifications may be made to this embodiment without departing from the true scope and spirit of the present invention, which is defined by the claims.

I claim:

1. A photo management system comprising:
   data storage;
   a first routine stored in data storage and executable to receive a photographic image file defining (i) a photographic image, (ii) capture location, and (iii) transmit location;
   a second routine stored in data storage and executable to read the photographic image file and identify the capture location and transmit location;
   a third routine stored in data storage and executable to select, based on capture location, a storage location for the photographic image;
   a fourth routine stored in data storage and executable to store the photographic image at the storage location;
   a fifth routine stored in data storage and executable to select, based on transmit location, a processing lab at which to print the photographic image;
   a sixth routine stored in data storage and executable to send the photographic image to the selected processing lab for printing.

2. The system of claim 1, wherein the photo management system further comprises a seventh routine stored in data storage and executable to send the photographic image into a network for printing the photographic image at the selected lab.

3. The system of claim 1, wherein the capture location and the transmit location are characterized in XML.

4. The system of claim 1, wherein the capture location and the transmit location are interleaved with the photographic image in the photographic image file.

5. The photo management system of claim 1, wherein the received photographic image file is provided by a digital camera that captured the photographic image and stored the captured photographic image in the photographic image file.

6. The photo management system of claim 5, wherein the camera comprises a camera phone.

7. The photo management system of claim 5, wherein the capture location is a geographic location where the image was captured and the transmit location is a geographic location where the digital camera was located when the digital camera transmitted the photographic image file.

8. The photo management system of claim 5, wherein the received photographic image file is transmitted from the digital camera over an air interface connection from the digital camera to a radio access network and, in turn, from the radio access network to the photo management system.

9. The photo management system of claim 1, wherein the capture location and the transmit location each comprise a location of a type selected from the group consisting of (i) geographic coordinates, (ii) street address, (iii) city, and (iv) postal code.

10. The photo management system of claim 1, wherein the received photographic image file is received from a computer.

11. The photo management system of claim 1, wherein the photographic image file defines the photographic image by containing pixel data representative of the photographic image.

12. The photo management system of claim 1, wherein the photographic image file defines the capture location by containing metadata indicating the capture location.

13. The photo management system of claim 12, wherein the metadata comprises a binary representation of XML.

14. The photo management system of claim 1, wherein the photographic image file defines the transmit location by containing metadata indicating the transmit location.

15. The photo management system of claim 14, wherein the metadata comprises a binary representation of XML.

* * * * *